US009667298B2

(12) United States Patent
Seo et al.

(10) Patent No.: US 9,667,298 B2
(45) Date of Patent: May 30, 2017

(54) MULTIPLEXER

(71) Applicant: Innertron, Inc., Incheon (KR)

(72) Inventors: Soo Duk Seo, Incheon (KR); Hak Rae Cho, Incheon (KR); Moon Bong Ko, Incheon (KR)

(73) Assignee: INNERTRON, INC., Incheon (KR)

( * ) Notice: Subject to any disclaimer, the term of this patent is extended or adjusted under 35 U.S.C. 154(b) by 267 days.

(21) Appl. No.: 14/539,077

(22) Filed: Nov. 12, 2014

(65) Prior Publication Data

US 2015/0282179 A1 Oct. 1, 2015

(30) Foreign Application Priority Data

Mar. 28, 2014 (KR) .................. 10-2014-0037064

(51) Int. Cl.
| | |
|---|---|
| *H01P 1/213* | (2006.01) |
| *H01P 7/10* | (2006.01) |
| *H04B 1/40* | (2015.01) |
| *H01Q 5/50* | (2015.01) |
| *H04W 72/04* | (2009.01) |

(Continued)

(52) U.S. Cl.
CPC ............. *H04B 1/40* (2013.01); *H01P 1/2053* (2013.01); *H01P 1/2084* (2013.01); *H01P 1/2136* (2013.01); *H01P 5/12* (2013.01); *H01P 7/10* (2013.01); *H01Q 5/50* (2015.01); *H04W 72/0453* (2013.01)

(58) Field of Classification Search
CPC ...... H01P 1/213; H01P 1/2138; H01P 1/2136; H01P 1/208; H01P 7/10; H01P 1/2084

USPC ............ 333/132, 134, 135, 175, 203, 219.1
See application file for complete search history.

(56) References Cited

U.S. PATENT DOCUMENTS 4,091,344 A * 5/1978 LaTourrette .......... H01P 1/2136
333/134
4,703,291 A 10/1987 Nishikawa et al.
(Continued)

FOREIGN PATENT DOCUMENTS

CN 203367455 12/2013
DE 3028925 2/1982
(Continued)

OTHER PUBLICATIONS

European Search Report—European Application No. 14182264.3, issued on Aug. 25, 2015, citing U.S. Pat. No. 6,806,791, CN 203 367 455, DE 30 28 925, EP 0 817 301, WO 02/054527, U.S. Pat. No. 4,703,291, US 2009/256652 and KR 100 976 251.

(Continued)

*Primary Examiner* — Stephen E Jones
*Assistant Examiner* — Rakesh Patel
(74) *Attorney, Agent, or Firm* — Cantor Colburn LLP

(57) ABSTRACT

A multiplexer including a housing including an antenna connector coupled to an antenna and a plurality of input and output connectors configured to receive or output a signal transmitted or received via the antenna according to a predetermined frequency band; a plurality of band pass filter units included in the housing and configured to pass a signal of a predetermined frequency band between the antenna connector and the plurality of input and output connectors; and a coupling unit including a plurality of feeding units to couple the antenna connector and the plurality of band pass filter units with one another.

6 Claims, 5 Drawing Sheets

(51) Int. Cl.
*H01P 1/205* (2006.01)
*H01P 1/208* (2006.01)
*H01P 5/12* (2006.01)

(56) References Cited

U.S. PATENT DOCUMENTS

| | | | |
|---|---|---|---|
| 6,556,101 B1 * | 4/2003 | Tada | ........................ H01P 7/04 333/134 |
| 6,806,791 B1 | 10/2004 | Wang et al. | |
| 9,325,048 B2 * | 4/2016 | Seo | ....................... H01P 1/2136 |
| 2009/0256652 A1 | 10/2009 | Salehi et al. | |

FOREIGN PATENT DOCUMENTS

| | | |
|---|---|---|
| EP | 0817301 | 1/1998 |
| KR | 1020080056545 | 6/2008 |
| KR | 20080114104 | 12/2008 |
| KR | 100976251 | 8/2010 |
| WO | 02054527 | 7/2002 |

OTHER PUBLICATIONS

Korean Office Action—Korean Application No. 10-2014-0037064 issued on Apr. 1, 2015, citing KR10-2008-0114104.

* cited by examiner

MULTIPLEXER

BACKGROUND

1. Technical Field

This invention relates to a multiplexer.

2. Description of the Related Art

With advancement in wireless communication technology, various wireless communication services can be used in mobile digital terminals. Such various wireless communication services include a Global System for Mobile communication (GSM) using a frequency band of 890 to 960 MHz, Personal Communication Services (PCS) using a frequency band of 1.8 GHz, World Interoperability for Microwave Access (WiMAX) using a frequency band of 3.6 to 3.8 GHz, a Wireless Local Area Network (WLAN) using a frequency band of 2.4 GHz or 5 GHz, Wireless Broadband Internet (WiBro) using a frequency band of 2.3 GHz, Bluetooth using a frequency band of 2.4 GHz, etc.

Recently, a multi-band antenna system has been used in mobile digital terminals to use wireless communication services provided at various frequency bands. The multi-band antenna system requires a resonator capable of achieving both narrow band characteristics and improved blocking characteristics.

PATENT DOCUMENT

Korean laid-open patent publication No. 2008-0056545

SUMMARY

One or more aspects of the present invention provide a multiplexer including a resonator having improved attenuation characteristics and band stop characteristics.

According to one aspect of the present invention, a multiplexer includes a housing including an antenna connector connected to an antenna, and a plurality of input and output connectors configured to input or output a signal transmitted or received via the antenna according to a predetermined frequency band; a plurality of band pass filter units included in the housing, and configured to pass a signal of a predetermined frequency band between the antenna connector and the plurality of input and output connectors; and a coupling unit including a plurality of feeding units to couple the antenna connector and the plurality of band pass filter units with one another.

The housing may further include a plurality of filtering partitions configured to partition filtering cavities disposed to correspond to the plurality of input and output connectors; and a plurality of coupling partitions configured to partition coupling cavities for accommodating the plurality of feeding units therein.

The plurality of band pass filter units may include a substrate coupled to a bottom surface of the housing to perform a ground operation; and a resonator coupled to the substrate, and including a conductive film coupled to at least one of lengthwise direction cross-sections of the body having a through-hole formed in one direction and a wall surface of the through-hole.

The body may be formed of a dielectric material and include the through-hole formed in one direction.

The conductive film may be coupled to the at least one of the lengthwise direction cross-sections of the body and the wall surface of the through-hole.

The housing may further include a first coupling disk coupled to the plurality of input and output connectors to transmit an input or output signal to at least one among the plurality of input and output connectors and the resonator, and disposed apart by a predetermined distance from the resonator.

The coupling unit may further include a second coupling disk coupled to the plurality of feeding units to transmit an input or output signal to at least one among the plurality of feeding units and the resonator, and disposed apart by a predetermined distance from the resonator.

The coupling unit may further include a conductive rod configured to connect the plurality of feeding units and coupled to the antenna connector.

The multiplexer may further include a cover coupled to the housing and configured to close an open surface of the housing.

The present invention provides a multiplexer including a resonator having improved attenuation characteristics and band stop characteristics.

DETAILED DESCRIPTION OF EMBODIMENTS

Figure 1:
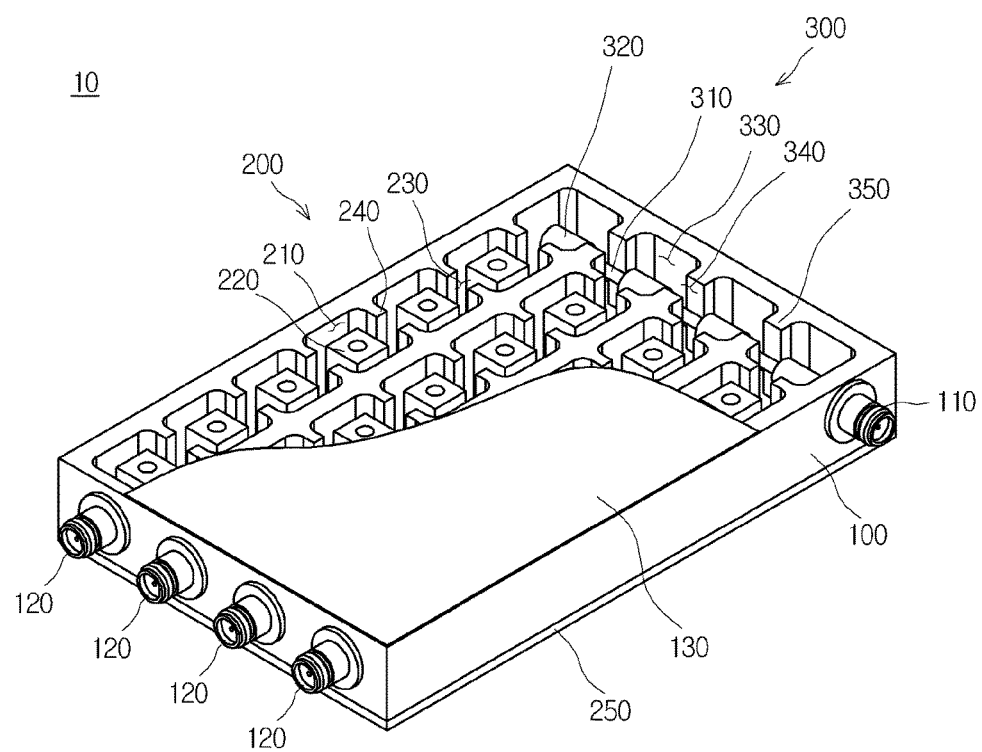
FIG. 1 is a diagram illustrating a multiplexer according to an embodiment of the present invention.

The present invention may be embodied in many different forms and accomplished in various embodiments. Thus, exemplary embodiments of the present invention will be illustrated in the drawings and described in the detailed description in detail. However, the present invention is not limited to the embodiments set forth herein and should be construed to cover all modifications, equivalents, and alternatives falling within the scope of the invention. In the following description, well-known functions or constructions are not described in detail if it is determined that they would obscure the invention due to unnecessary detail.

It will be understood that, although the terms 'first,' 'second,' 'third,' etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section.

The terminology used herein is for the purpose of describing particular embodiments only and is not intended to be limiting of the invention. As used herein, the singular forms 'a,' 'an,' and 'the' are intended to include the plural forms as well, unless the context clearly indicates otherwise. It will be further understood that the terms 'comprises' and/or 'comprising,' when used in this specification, specify the presence of stated features, integers, steps, operations, elements, and/or components, but do not preclude the presence or addition of one or more other features, integers, steps, operations, elements, components, and/or groups thereof.

Hereinafter, multiplexers according to various embodiments of the present invention will be described in detail with reference to the accompanying drawings. The same or corresponding elements are denoted by the same reference numerals throughout the drawings and are not to be redundantly described here.

FIG. 1 is a diagram illustrating a multiplexer according to an embodiment of the present invention.

Figure 2:
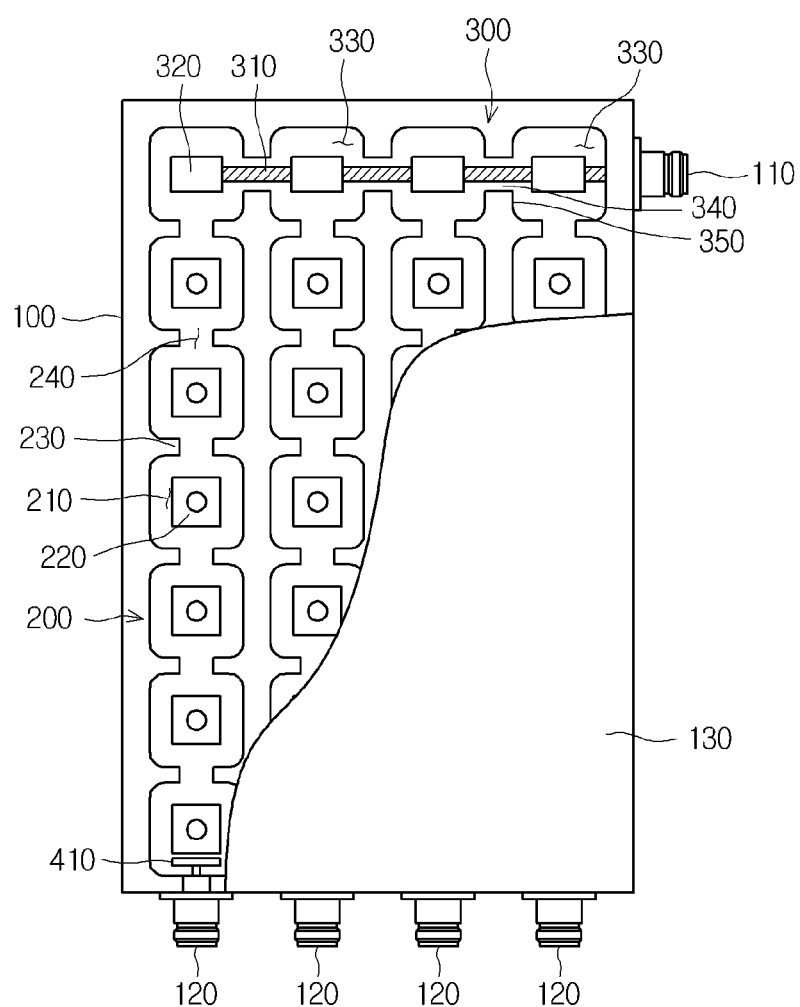
FIG. 2 is a diagram illustrating an internal structure of a multiplexer according to an embodiment of the present invention.

FIG. 2 is a diagram illustrating an internal structure of a multiplexer according to an embodiment of the present invention.

Referring to FIGS. 1 and 2, a multiplexer according to an embodiment of the present invention includes a housing 100 including an antenna connector 110 and a plurality of input/output connectors 120, a band pass filter unit 200 including a plurality of resonators 220 included in the housing 100, and a coupling unit 300 including a plurality of feeding units 320.

The housing 100 may include the antenna connector 110 connected to an antenna (not shown) to bi-directionally transmit or receive a radio signal, and the plurality of input/output connectors 120 configured to bi-directionally input/output a particular frequency band of the radio signal transmitted or received via the antenna.

The plurality of input/output connectors 120 may be connected to a signal processing circuit (not shown) for processing a signal transmitted or received via the antenna. The signal processing circuit may process a signal transmitted via the plurality of input/output connectors 120 according to a frequency band. For example, the signal processing circuit may include a radio-frequency (RF) circuit.

The band pass filter unit 200 may pass a signal of a predetermined frequency band among various frequency bands. In detail, the band pass filter unit 200 may be included in the housing 100, and selectively pass a signal of a frequency band predetermined between the antenna connector 110 and the plurality of input/output connectors 120 as illustrated in FIGS. 1 and 2. Also, a plurality of band pass filter units 200 may be included in the housing 100 to connect the plurality of input/output connectors 120 and the coupling unit 300.

Each of the plurality of band pass filter units 200 may transmit a signal between the antenna connector 110 and one of the plurality of input/output connectors 120 and pass a signal of a predetermined frequency band. To this end, the plurality of band pass filter units 200 may include a substrate 250 coupled to the housing 100 to perform a ground operation, and the plurality of resonators 220 coupled to the substrate 250 and installed in a plurality of filtering cavities 210 formed in the housing 100.

The plurality of filtering cavities 210 will now be described before the plurality of resonators 220 are described.

The plurality of filtering cavities 210 may be formed by perforating the housing 100 in a predetermined form.

The plurality of filtering cavities 210 may be partitioned in a groove form by a plurality of filtering partitions 240 to accommodate the plurality of resonators 220 therein. In this case, the plurality of filtering cavities 210 for accommodating the plurality of resonators 220 may be formed such that cross-sections cut in parallel with a horizontal plane have a round, oval, or polygonal shape. For example, the plurality of filtering cavities 210 for accommodating the resonator 220 may be formed in a cylindrical or tetragonal shape to be long in a direction from a top surface of the housing 100 to a bottom surface of the housing 100.

In the plurality of filtering partitions 240, filtering windows 230 may be formed to form a signal transmission path between adjacent filtering cavities 210, i.e., to open a region between adjacent filtering cavities 210. Also, the plurality of filtering cavities 210 may be partitioned in a predetermined size by the plurality of filtering partitions 240 to adjust the amount of coupling between the plurality of resonators 220 accommodated in the plurality of filtering cavities 210. Here, the plurality of filtering cavities 210 may extend to be long in a direction such that the plurality of filtering windows 230 are arranged in a line.

The housing 100 may be formed in a square shape as illustrated in FIGS. 1 and 2 but is not limited thereto and may be formed in various shapes as needed. Also, the housing 100 may be plated with a conductive material. For example, in the housing 100, wall surfaces of the plurality of filtering cavities 210 may be plated with silver (Ag) or copper (Cu). Also, the housing 100 may be coupled to the substrate 250 below the housing 100 to accommodate the plurality of resonators 220 in the plurality of filtering cavities 210.

The housing 100 may further include a first coupling disk 410 connected to each of the plurality of input/output connectors 120 so as to transmit an input/output signal to at least one among the plurality of input/output connectors 120 and the plurality of resonators 220. For example, the first coupling disk 410 may transmit signals received via the plurality of input/output connectors 120 to the plurality of resonators 220 or transmit signals output from the plurality of resonators 220 to the plurality of input/output connectors 120. The first coupling disk 410 may be arranged in the plurality of filtering cavities 210 in the housing 100 to be spaced apart from the plurality of input/output connectors 120. Thus, the first coupling disk 410 may induce electromagnetic waves input/output to pass only a signal of a desired frequency band.

A cover 130 may be coupled to a top surface of the housing 100 to isolate the inside of the housing 100 from the outside. Here, the cover 130 is coupled to the top surface of the housing 100 to close an open surface of the housing 100. Also, the cover 130 may be formed of a material having predetermined hardness to protect the inside of the housing 100 from external shocks. In addition, the cover 130 may be formed of a conductive material to reflect a signal emitted from the inside of the housing 100.

The plurality of resonators 220 of the band pass filter unit 200 will be described in detail with reference to FIG. 3 below.

Figure 3:
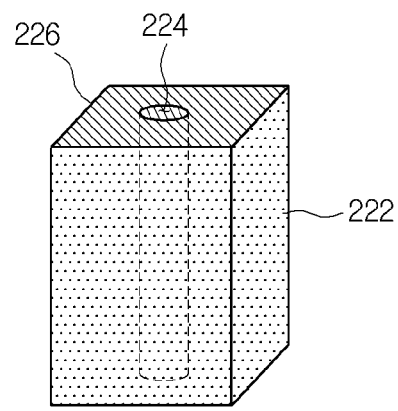
FIG. 3 is a diagram illustrating a structure of a resonator according to an embodiment of the present invention.

FIG. 3 is a diagram illustrating a structure of a resonator according to an embodiment of the present invention.

Referring to FIG. 3, the resonator 220 according to an embodiment of the present invention includes a body 222, a through-hole 224, and a conductive film 226.

The body 222 may be formed of a mixture or a compound of at least one selected from a dielectric material group including ceramic. The body 222 may be formed such that a cross-section cut in one direction has a shape selected among a round shape, an oval shape, and a polygonal shape. The body 222 may extend in a direction perpendicular to the cut cross-section thereof. For example, the body 222 may have a cylindrical shape, a cylindroid shape, or a rectangular parallelepiped shape. The body 222 may include a through-hole 224 formed to pass through the body 222.

The through-hole 224 may be formed in a lengthwise direction of the body 222. Here, the through-hole 224 may be formed in a predetermined diameter. Also, the through-hole 224 may be formed in a length corresponding λ/4 of a resonance frequency. However, the length of the through-hole 224 may vary when the body 222 is formed of ceramic having a high dielectric constant.

The conductive film 226 may be coupled to at least one of cross-sections of the body 222 in a lengthwise direction. Also, the conductive film 226 may be coupled to a wall surface of the through-hole 224. Here, the conductive film 226 may be formed of a conductive material such as a metal. The body 222 may be plated with the conductive film 226.

The substrate 250 will be described in detail with reference to FIG. 4 below.

Figure 4:
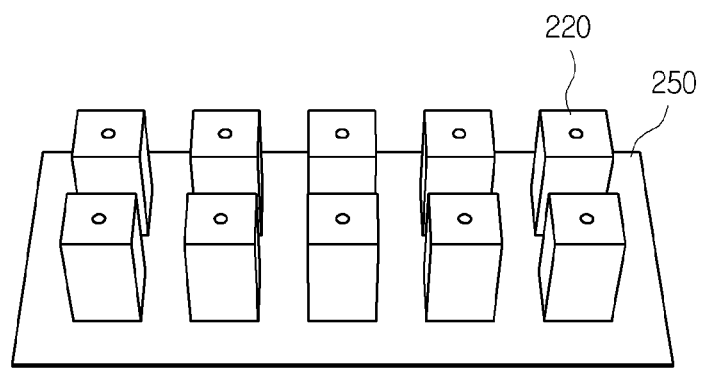
FIG. 4 is a diagram illustrating a structure in which a resonator is mounted on a substrate according to an embodiment of the present invention.

FIG. 4 is a diagram illustrating a structure in which a resonator is mounted on a substrate according to an embodiment of the present invention.

Referring to FIG. 4, at least one resonator 220 is mounted on a surface of the substrate 250. In this case, the at least one resonator 220 may be mounted on a predetermined location on the substrate 250 to accommodate the at least one resonator 220 in a filtering cavity 210 of the housing 100. Also, the substrate 250 may be electrically connected to the at least one resonator 220. The substrate 250 may perform a ground operation. For example, the substrate 250 may be a printed circuit board including a conductive pattern (including an electrode) for ground connection.

Here, the number of the at least one resonator 220 mounted on the substrate 250 may vary according to a frequency band predetermined to filter a signal.

Referring back to FIG. 1, the coupling unit 300 is disposed in the housing 100 between the antenna connector 110 and the plurality of band pass filter units 200 to couple the antenna connector 110 and the plurality of band pass filter units 200 to one another.

Here, the coupling unit 300 may include the plurality of feeding units 320 to couple the antenna connector 110 and each of the plurality of band pass filter units 200 in an open manner. The coupling unit 300 may be formed in a coupling structure to be coupled to the antenna connector 110 so as to form a signal transmission path.

The coupling unit 300 may include a conductive rod 310 coupled to the antenna connector 110, the plurality of feeding units 320 disposed apart from each other in a lengthwise direction of the conductive rod 310, and coupling cavities 330 formed in the housing 100 such that the conductive rod 310 crosses the inside of the housing 100.

Figure 5:
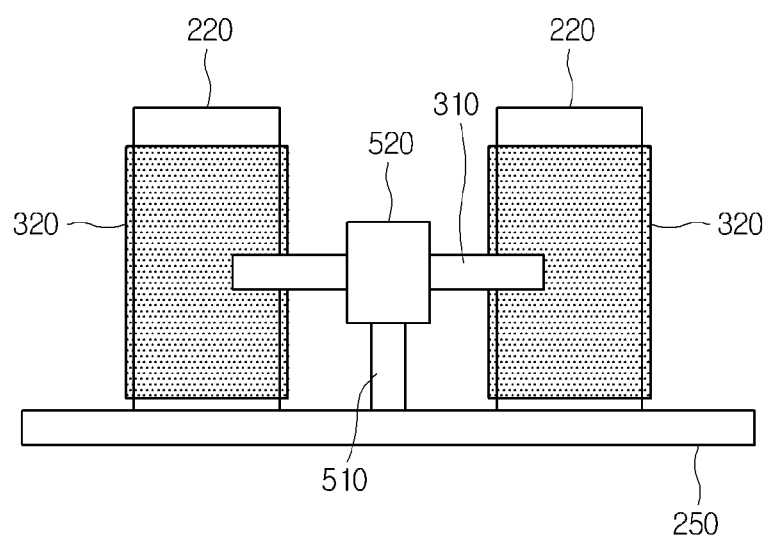
FIG. 5 is a diagram illustrating a structure of a coupling unit according to an embodiment of the present invention.

The conductive rod 310 may extend in a direction to be coupled to the antenna connector 110, and be formed in a bar shape having a predetermined diameter. The conductive rod 310 may be formed of a conductive material. The conductive rod 310 may be fixed at a predetermined height by a fixed body support 510 and a fixed body 520 coupled to a top surface of the substrate 250 as illustrated in FIG. 5. Here, the fixed body 520 may be formed of a non-conductive material such as TEFLON.

Each of the plurality of feeding units 320 may transmit a signal of a predetermined frequency band to or receive the signal of the predetermined frequency band from the band pass filter unit 200 corresponding to the predetermined frequency band as illustrated in FIG. 5. To this end, each of the plurality of feeding units 320 may be formed in a predetermined diameter and length to form an inductance and a capacitance corresponding to the predetermined frequency band.

Here, each of the plurality of feeding units 320 may extend from a central axis of the conductive rod 310 to the outside the conductive rod 310 to be formed in a diameter that is greater than the diameter of the conductive rod 310. Also, each of the plurality of feeding units 320 may be disposed apart by a predetermined distance from the resonator 220 of a band pass filter unit 200 most adjacent thereto according to design conditions. Also, the plurality of feeding units 320 may be disposed apart by a predetermined distance from one another not to influence frequency characteristics thereof. The amount of coupling of signals to be transmitted via the plurality of feeding units 320 may be changed by adjusting the distances between each of the plurality of feeding units 320 and a resonator 220 most adjacent thereto.

The coupling cavities 330 may be formed by perforating the housing 100 to accommodate the conductive rod 310 and the plurality of feeding units 320 therein. Also, the coupling cavities 330 may be formed to extend in a direction crossing the filtering cavity 210.

The coupling cavities 330 may be partitioned in a groove form by a plurality of coupling partitions 350 to accommodate the plurality of feeding units 320 therein. In this case, the coupling cavities 330 for accommodating the plurality of feeding units 320 therein may each have a round, oval, or polygonal shaped cross-section that is cut in parallel with a horizontal plane. For example, the coupling cavities 330 for accommodating the plurality of feeding units 320 therein may have a cylindrical or square pillar shape formed to be long in a direction from a top surface of the housing 100 to a bottom surface of the housing 100.

Here, a coupling window 340 having a partially open structure may be formed in the plurality of coupling partitions 350 such that adjacent coupling cavities 330 are connected to each other.

Also, the coupling window 340 may support the conductive rods 310 accommodated in the coupling cavities 330. In this case, a support member (not shown) may be formed on the coupling window 340 to support the conductive rods 310.

The coupling unit 300 may change the amount of coupling of signals transmitted via the feeding units 320 by changing the diameters of the conductive rods 310, the lengths of the feeding units 320, the diameters of the feeding units 320, the distances between the feeding units 320, the degree of openness of the coupling window 340, etc. Thus, the coupling unit 300 may change a frequency bandwidth.

Also, in the coupling unit 300, the conductive rods 310 and the feeding units 320 may be formed in an integral type (module type). The conductive rods 310 and the feeding units 320 formed in the integral type may be easily accommodated in the coupling cavities 330. The coupling unit 300 has high durability to improve the reliability of the product, compared to a short type coupling structure formed by soldering.

Figure 6:
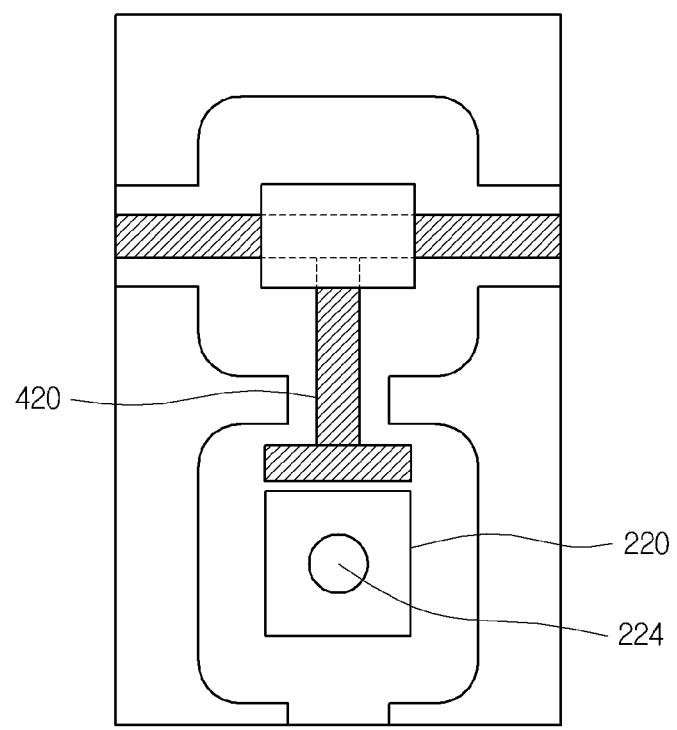
FIG. 6 is a diagram illustrating a structure of a coupling unit according to another embodiment of the present invention.

The coupling unit 300 may include a second coupling disk 420 connected to the feeding units 320 to transmit an input/output signal to at least one of the resonators 220 and the feeding units 320 as illustrated in FIG. 6. For example, the second coupling disk 420 may transmit a signal output from the resonator 220 to the feeding unit 320 or transit a signal received from the feeding unit 320 to the resonator 220. The second coupling disk 420 may be disposed apart from the resonator 220 in the filtering cavity 210.

A multiplexer according to an embodiment of the present invention is capable of improving attenuation characteristics and band stop characteristics using a resonator formed of ceramic. Also, in the multiplexer according to an embodiment of the present invention, a single antenna port feeding structure is formed to enable a plurality of wireless communication services to be used with one antenna. Also, in the multiplexer according to an embodiment of the present invention, a coupling unit is formed in an open type coupling structure that is a simple linear type and that can be easily installed, thereby minimizing interference between band pass filter units. Also, in the case of the multiplexer according to an embodiment of the present invention, a manufacturing process may be simplified using an open type coupling structure, which is a simple linear type and can be easily installed, at a mass-production level.

While this invention has been particularly shown and described with reference to exemplary embodiments thereof, it will be understood by those of ordinary skill in the art that various changes in form and details may be made therein without departing from the spirit and scope of the invention as defined by the appended claims.

The exemplary embodiments disclosed herein should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A multiplexer comprising:
   a housing including an antenna connector connected to an antenna, and a plurality of input and output connectors configured to input or output a signal transmitted or received via the antenna according to a predetermined frequency band;
   a plurality of band pass filter units included in the housing, and configured to pass a filtered frequency band of the signal between the antenna connector and the plurality of input and output connectors; and
   a coupling unit including a plurality of feeding units to couple the antenna connector and the plurality of band pass filter units with one another,
   wherein the plurality of band pass filter units comprise a substrate coupled to a bottom surface of the housing to perform a ground operation and a resonator coupled to the substrate,
   wherein the resonator comprises:
      a body formed of a dielectric material and including a through-hole formed in one direction so as to penetrate the body from a top surface to a bottom surface of the body; and
      a conductive film plated on an inner surface of the through-hole and at least one of the top surface and the bottom surface of the body without being plated on a side surface of the body so that the dielectric material is exposed at the side surface of the body whereon the conductive film is not plated.

2. The multiplexer of claim 1, wherein the housing further comprises:
   a plurality of filtering partitions configured to partition filtering cavities disposed to correspond to the plurality of input and output connectors; and
   a plurality of coupling partitions configured to partition coupling cavities for accommodating the plurality of feeding units therein.

3. The multiplexer of claim 1, further comprising a cover coupled to the housing and configured to close an open surface of the housing.

4. The multiplexer of claim 1, wherein the coupling unit further comprises a conductive rod coupled to the antenna connector and configured to connect the plurality of feeding units together.

5. The multiplexer of claim 1, wherein the coupling unit further comprises a second coupling disk coupled to the plurality of feeding units to transmit the signal to at least one among the plurality of feeding units and the resonator, and the second coupling is disk disposed apart from the resonator by a predetermined distance.

6. The multiplexer of claim 1, wherein the housing further comprises a first coupling disk coupled to the plurality of input and output connectors to transmit the signal to at least one among the plurality of input and output connectors and the resonator, and the first coupling is disk disposed apart from the resonator by a predetermined distance.

* * * * *